United States Patent [19]
Laurent et al.

[11] Patent Number: 5,851,677
[45] Date of Patent: Dec. 22, 1998

[54] COATING COMPOSITION FOR CARBON-CONTAINING PRODUCTS AND SAID COATING

[75] Inventors: Veronique Laurent, Voreppe; Denis Paillet, La Frette, both of France

[73] Assignees: Carbone Savoie, Aigueblanche Cedex; Aluminum Pechiney, Courbevoie, both of France

[21] Appl. No.: 687,321

[22] PCT Filed: Jan. 31, 1996

[86] PCT No.: PCT/FR96/00164

§ 371 Date: Aug. 5, 1996

§ 102(e) Date: Aug. 5, 1996

[87] PCT Pub. No.: WO96/23745

PCT Pub. Date: Aug. 8, 1996

[30] Foreign Application Priority Data

Feb. 3, 1995 [FR] France .................................. 95 01468

[51] Int. Cl.$^6$ ................................ B32B 9/04; B32B 13/04
[52] U.S. Cl. .................. 428/446; 106/286.5; 106/287.1; 423/327.1; 423/328.1; 423/332; 427/299; 427/397.7; 427/421; 427/429; 428/341; 501/125; 501/128; 204/279; 204/290 R
[58] Field of Search .................................. 106/35, 286.5, 106/287.1; 423/327.1, 328.1, 332; 501/125, 128; 428/341, 446; 427/299, 397.7, 421, 429; 204/279, 290 R

[56] References Cited

U.S. PATENT DOCUMENTS 4,888,311  12/1989  Davidovits et al. ................. 501/154 X
5,194,091   3/1993  Laney ................................... 106/628 X
5,352,427  10/1994  Davidovits et al. .................. 423/328.1

FOREIGN PATENT DOCUMENTS 0399786   11/1990  European Pat. Off. .
2659963    9/1991  France .
0 489 667 A1  6/1992  France .
WO 88/01721  3/1988  WIPO .
WO91/13840   9/1991  WIPO .
WO 93/13033  7/1993  WIPO .

OTHER PUBLICATIONS

Orlinski, Joseph, Composites á Matrices Minérales de type Géopolymére, Geopolymer '88, vol. 2,pp. 315–324, 1988.

*Primary Examiner*—Michael Lusignan
*Attorney, Agent, or Firm*—Oblon, Spivak, McClelland, Maier & Neustadt, P.C.

[57] ABSTRACT

Composition for a coating protecting the surfaces of carbon-containing products exposed to a hot, oxidizing environment such as the parts of anodes not immersed in the molten salt bath and the liners of the aluminum electrolysis cells and more generally the non-immersed parts of carbon-containing refractory elements used in electrolysis conducted below 950° C. in a molten salt bath, comprising a geopolymer, preferably in the fluoropoly(sialate-disiloxo) family, the other components possibly being water as well as alumina and/or a refractory other than silica. Coating protecting the surfaces of carbon-containing products exposed to a hot, oxidizing environment such as the non-immersed parts of carbon-containing refractory elements used in electrolysis conducted below 950° C. in a molten salt bath, including polysilicates and at least one inorganic polymer in the poly(sialate) family, preferably fluoropoly(sialate-disiloxo), also possibly with alumina or another refractory other than silica. Anode of an aluminum electrolysis cell coated with said coating.

18 Claims, No Drawings

COATING COMPOSITION FOR CARBON-CONTAINING PRODUCTS AND SAID COATING

TECHNICAL FIELD OF INVENTION

The invention relates to oxidation protection of carbon-containing products subjected to a hot, oxidizing environment whose temperature does not exceed 950° C. These are, for example, the parts of anodes not immersed in the molten salt bath and the liners of aluminum electrolysis cells and in general the parts of carbon-containing refractory elements used in electrolysis conducted at less than 950° C. that are not immersed in a molten salt bath. The electrolysis to which the present invention relates is hence, for example, of the type performed to fabricate aluminum, magnesium, calcium, strontium, or alloys such as iron-neodymium or lanthanum-nickel. It may also relate to protection of the hot parts of the carbon or graphite electrodes of electric furnaces used in particular for making steels and ferro-alloys that project from the charge, to the extent that these electrodes are exposed for a long time to an oxidizing atmosphere whose temperature remains below 950° C.

PRIOR ART

In general, the anodes and liners of an aluminum electrolysis cell are not totally protected against oxidation. In cells with "pinholes" the anodes are protected only by a powder "cover layer" composed of alumina powder and ground bath solids, of greater or lesser thickness and permeable to air. The liners are impregnated with retardants effective at temperatures below 600° C.

It should be noted with regard to the anodes that it is particularly at the tapholes and alumina inlet holes, namely the points where the "cover layer" is distinctly thinner or even nonexistent, that protection is most lacking. With regard to the liners, it should be noted that anti-oxidation protection becomes a substantial problem for cells operated at over 200,000 amperes.

The quantity of carbon consumed unnecessarily, namely outside the unavoidable depolarization reaction specific to electrolysis, may be estimated at about sixty kilograms per metric ton of aluminum produced. Half of this overconsumption is due to the carboxy reactivity of the anode in the molten salt bath and the other half to burnup of the non-immersed parts of the anode surfaces. It can be seen that about thirty kilograms of anode carbon could be saved per ton of aluminum produced if these anodes were more effectively protected against oxidation. In addition to the saving in materials, there is an advantageous economy from decreased servicing of the cell due to the longer life of the carbon-containing elements thus protected.

It is well known that coatings may be used to protect carbon-containing surfaces, but these coatings are unsuitable for the application in question, as they are generally intended for use at higher temperatures, expensive to use, and polluting.

Thus, Patent Application WO-A-93/20026 discloses a coating that protects all the cell elements, including cathodes, against corrosion in the salt bath and against oxidation when hot. However, its application requires a dryout phase followed by sintering, which is particularly expensive and difficult to accomplish due to the weight and size of the anodes. Moreover, the numerous elements contained in this coating (borides, carbides, colloidal silica, etc.) have the disadvantage of polluting the aluminum produced by the salt bath and the recycled anode "stubs." Since recycling of the bath and stubs is a determining factor in electrolysis efficiency, a solution that eliminates it loses much of its value.

In addition, Application EP-A-0,269,534 claims a coating that protects the shafts of the anodes and the projecting parts of the anodes used in aluminum production cells for electrolysis of alumina dissolved in molten cryolite melted by the Hall-Héroult process. It can be seen that the coating according to EP-A-0,269,534 indeed plays its protective role by sealing the iron of the anodes but does not effectively protect the carbon of the anodes against oxidation, particularly in the areas closest to the bath where the temperature exceeds 550° C.

Finally, other solutions such as that of Application EP-A-0,609,160 relate to stable forms of protection at temperatures far higher than 950° C. They require vitrification treatment at 600° C. to 700° C. which is difficult and expensive, particularly because of the volume and weight of the anodes to be treated.

Thus, it remains to find an inexpensive coating that protects the surfaces of carbon-containing products against oxidation up to 950° C., the usual temperature measured above the molten salt bath of an aluminum electrolysis cell. This coating should not pollute the metal produced.

DESCRIPTION OF INVENTION

We will designate by the word "slip" a set of components which, after mixing, constitute a suspension of micrometric particles in an aqueous solvent, designed to be deposited on a surface to be protected. While it is drying, the structure of this slip changes such that the deposited layer becomes a coating on the surface to be protected.

A first object of the invention is the use of a geopolymer entering into the composition of a slip used for a coating protecting the surface of carbon-containing products exposed to a hot, oxidizing environment, such as the parts of the anodes not immersed in the molten salt bath as well as the liners of aluminum electrolysis cells and, more generally, the non-immersed parts of carbon-containing refractory elements used in a type of electrolysis conducted at less than 950° C. in a molten salt bath.

A geopolymer is a reactive aluminosilicate binder obtained by mixing two components that remain inert when used separately. These components are a liquid hardener and an inorganic polymer, in the powder form, having sialate $M_n$ $(-Si-O-Al-O)_n$ groups, where M designates alkaline or alkaline-earth cations such as $Na^+$, $K^+$, and $Ca^{++}$. The hardener is an aqueous solution of inorganic polymers based on very highly alkaline polysilicates, which favors polycondensation, a reaction that occurs after mixing with the powder and represents an expulsion of water outside the crystal lattice of the geopolymer formed.

Of the reactive aluminosilicate binders (liquid hardener+ powder) entering into the compositions claimed, one may cite those sold under the registered trademark Géopolymite®.

Preferably, the powders chosen include, among said sialates, those in the poly(sialate-disiloxo)$M_n$ $(-Si-O-Al-O-Si-O-Si-O)_n$ family.

Advantageously, the invention relates to those of the fluoropoly(sialate-disiloxo), $F,M_n$ $(-Si-O-Al-O-Si-O-Si-O)_n$ family.

Indeed, the applicant was surprised to discover that the geopolymers, and in particular those of the poly(sialate-disiloxo) family and especially of the fluoropoly(sialate-disiloxo) family, have remarkable film-forming properties, namely they facilitate deposition of the coating in the form of a continuous, clinging film that protects effectively against oxidation under hot conditions.

The applicant has found that the coating provides improved protection when the geopolymer, preferably belonging to the fluoropoly(sialate-disiloxo) family, enters into the composition of the slip in a proportion greater than 60 wt. %.

According to the invention, the components of this composition come in two different states: a solid state, in the powder form, and including at least the powder of said geopolymer, and a liquid state, including at least the hardener of said geopolymer.

Said powder and said liquid, mixed with a view to preparing a slip, have weight concentrations such that the slip obtained is sufficiently fluid that it can easily spread over the surface and sufficiently charged with solid particles to have good consistency and avoid running upon deposition. Preferably, the sum of the weight concentrations of the solid components is greater than 1.2 times and less than twice the sum of the weight concentrations of the liquid components.

According to one embodiment of the invention, added alumina advantageously allows the geopolymer proportion to be decreased, thus decreasing the cost of the coating, the risks of polluting the salt bath, and even the sight risks of crazing of the coating. The latter becomes unacceptable, however, when the proportion of alumina is too high; thus the alumina concentration is limited to 15 wt. %.

While remaining within the scope of the invention, it is also possible to add a refractory element other than alumina in powder form. Said refractory other than alumina preferably belongs to the group comprising the carbides, borides, nitrides, silicides, and oxides as well as any mixture of these various components. As far as aluminum electrolysis is concerned, these elements combined with aluminum or with silicon will preferably be chosen in order not to pollute the metal produced. Silicon acts in contact with the bath, giving off a gaseous compound, $SiF_6$, which leaves the bath and thus does not pollute the metal. A particularly advantageous embodiment of the invention described in Example 2 shows that adding up to 30% silica yields good results.

The applicant has also observed that it may be advantageous to add water so that the viscosity of the mixture is more favorable to its pulverization. This addition of water also improves the covering power of the mixture. However, the proportion of water thus added, called additional water, is limited to 25 wt. % to avoid formation of a nonprotective porous coating.

One advantage of the invention is the possibility of directly depositing the slip produced by the mixture of said composition on the surface to be protected. No particular preparation of said surface is required, but in the case of anodes it is preferable to remove the carbon dust that adheres to their surfaces, by brushing for example.

Preparation of the slip consists of mixing the components of the composition according to the invention cold, namely at a temperature close to room temperature, preferably using a magnetic stirrer. The slip thus obtained is then deposited on the surface to be protected with very simple or even rudimentary means such as local deposition done manually by coating with a brush or by spraying with a gun. The aim is to cover said surface continuously to a given thickness. Here, the thickness is expressed in terms of the quantity of material deposited per unit area, measured after drying. It is between 40 $mg/cm^2$ and 100 $mg/cm^2$, and preferably between 55 $mg/cm^2$ and 65 $mg/cm^2$.

Another advantage of the invention is that the coating is obtained by drying of said slip at room temperature. During drying, the deposit hardens by polycondensation, namely by expulsion of water from the crystal lattice. This hardening may be very rapid, taking about an hour, at a temperature of approximately 80° C. However it is preferable to leave it to harden for about thirty hours at room temperature in order not to resort to cumbersome and expensive handling and heating methods.

A second object of the invention is the coating so obtained, namely a coating protecting the surfaces of carbon-containing products exposed to a hot, oxidizing medium such as the parts of the anodes not immersed in the molten salt bath and the liners of the aluminum electrolysis cells, and in general the non-immersed parts of carbon-containing refractory elements used in electrolysis conducted at temperatures below 950° C. in a molten salt bath, characterized by containing polysilicates and at least one inorganic alkaline polymer having sialate groups.

According to one embodiment of the invention, said oxidation-protection coating contains at least one inorganic polymer from the poly(sialate-disiloxo) family. Advantageously, this inorganic polymer is in the fluoropoly (sialate-disiloxo) family.

According to one embodiment of the invention, said oxidation-protective coating also contains alumina and possibly another refractory component. Said other refractory preferably belongs to the group of carbides, borides, nitrides, silicides, and oxides as well as any mixture of these various components.

Preferably, said coating protecting carbon-containing elements against hot oxidation covers the surface to be protected continuously with an application thickness between 40 $mg/cm^2$ and 100 $mg/cm^2$, and preferably between 55 $mg/cm^2$ and 65 $mg/cm^2$ of material per unit area.

One advantage of the invention is that said coating, composed of alumina and aluminosilicates, causes little pollution of the aluminum electrolysis bath even after the unconsumed anode ends (known as "stubs") and the salt bath have been recycled because the silicon, as already pointed out, is largely eliminated by formation of the gaseous compound $SiF_6$.

Another advantage of the invention is that the cell elements thus coated have greater resistance to operational fluctuations of the cell, which allows the thickness of the "cover layer" to be reduced and hence the thermal insulating property of the cell to be adjusted to ensure the best desired heat balance.

Finally, the protection provided by this coating improves the overall mechanical strength of the anodes and liners to which a solidified arch often attaches in the bath. The latter forms in the "cover layer" but it can detach from it suddenly due to oxidative breakdown of the upper parts of the anodes and liners. Operating accidents linked to these arch collapses are hence less frequent and production is hence less of a problem.

A third object of the invention is an aluminum electrolysis cell anode coated with said coating. It need only be coated on that part of it that is exposed to the oxidizing action of the atmosphere prevailing above the electrolysis bath.

One advantage of the invention is that the anode thus coated has an extended service life because of the combination of two phenomena: less oxidation of the surface and regular consumption kinetics. This gives better control of the heights of the unconsumed anodes below the sealing plug, resulting in decreased residual height under the plug of the anode stub, which is a compulsory reserve designed to avoid any contact between the bath and the cast iron or steel seal, thus avoiding possible resultant pollution of the bath with iron. The applicant has found that the service life of anodes coated with the coating according to the invention was extended by about 5%, which advantageously decreased the number of anode replacements.

EXAMPLES

EXAMPLE 1

Over 150 samples have been tested to observe the quality of the anti-oxidation protection of about twenty coatings obtained from geopolymers. The compositions were obtained from two powders known as HT600 and HT615 in the product line sold as GEOPOLYMITE®, both of which belong to the fluoropoly(sialate-disiloxo) families.

Each of these powders has been mixed with the liquid hardener GP 70/AN used as such or mixed in equal parts with liquid GP 20/A. Liquid GP 70/AN is rich in $K^+$ ions while liquid GP 20/A is rich in $Na^+$ ions. Alumina was added to certain mixtures. This is "clean" low-phosphorous alumina, specifically a calcinated alumina bearing the ALTECH® trademark, number AC34B6. Particle-size analysis revealed an average diameter of approximately 5.8 microns. Some aluminas also contained silica.

All the compositions were obtained after mixing and magnetic stirring. Each preparation obtained was sprayed by compressed air onto a carbon sample to a thickness of 0 to 100 mg/cm$^2$; after drying the samples were exposed for 16 hours to different temperatures in an oxidizing atmosphere (static air).

The coating quality was evaluated according to two criteria:

1) Tendency to craze before and after exposure to a hot oxidizing atmosphere. Visual evaluation of the surface was scored 0 (no crazing) to 10 (substantial crazing). Results with scores of 0 to 6 are found to be acceptable.

2) Resistance to oxidation of the coated surface. The samples were exposed to static fresh air for 16 hours at various temperatures: 500° C., 750° C., and 950° C.

Oxidation is expressed in weight loss per unit area. It is therefore expressed in mg/h/cm$^2$. In the absence of a coating, surface oxidation of the portion of the anode results in consumption of #80 mg/h/cm$^2$ at 500° C., #180 mg/h/cm$^2$ at 750° C., and #210 mg/h/cm$^2$ at 950° C.

Table 1 lists the compositions, all relative to 100 grams of geopolymer powder used, that produced coatings deposited to a thickness of 100 mg/cm$^2$ and all of which protected effectively against oxidation at 500° C. Although they worked well, it is not the "pure" geopolymers used, in other words without additional water, alumina, or silica, that give the best results. The alumina concentration is necessarily limited due to crazing. On the other hand, the silica can be fairly abundant, for example in test No. 18 when its concentration reached 30% while conferring good properties on the coating.

TABLE 1

| | COMPOSITION | | | | | | | Percentage | | | Solid/ | CRAZING | | |
| --- | --- | --- | --- | --- | --- | --- | --- | --- | --- | --- | --- | --- | --- | --- |
| TEST NO. | HT600 g | HT615 g | GP70/AN g | GP20/AN g | Alumina g | Silica g | Water g | Geopolymer | Alumina | Water | liquid ratio | Before | After | OXIDATION mg/h/cm2 |
| 1 | 0 | 100 | 75.5 | 0.0 | 17.7 | 0.0 | 0.0 | 91% | 9% | 0% | 1.56 | 4 | 4 | 4.9 |
| 2 | 0 | 100 | 66.7 | 0.0 | 0.0 | 0.0 | 0.0 | 100% | 0% | 0% | 1.50 | | 5 | 8.0 |
| 3 | 0 | 100 | 51.3 | 0.0 | 0.0 | 0.0 | 11.3 | 93% | 0% | 7% | 1.60 | 0 | 0–3 | 3.0 |
| 4 | 0 | 100 | 51.3 | 0.0 | 0.0 | 0.0 | 5.1 | 97% | 0% | 3% | 1.77 | 0 | 0 | 3.2 |
| 5 | 0 | 100 | 51.3 | 0.0 | 0.0 | 0.0 | 0.0 | 100% | 0% | 0% | 1.95 | | 1 | 15.6 |
| 6 | 0 | 100 | 51.0 | 0.0 | 0.0 | 40.8 | 20.4 | 71% | 0% | 10% | 1.97 | 6 | 1 | 10.0 |
| 7 | 0 | 100 | 51.0 | 0.0 | 17.7 | 0.0 | 12.7 | 83% | 10% | 7% | 1.85 | | 3 | 9.9 |
| 8 | 0 | 100 | 37.8 | 37.8 | 17.7 | 0.0 | 0.0 | 91% | 9% | 0% | 1.56 | 5 | 5 | 9.7 |
| 9 | 0 | 100 | 25.6 | 25.6 | 0.0 | 0.0 | 21.0 | 88% | 0% | 12% | 1.38 | 5 | 5 | 6.4 |
| 10 | 0 | 100 | 25.6 | 25.6 | 0.0 | 0.0 | 11.3 | 93% | 0% | 7% | 1.60 | 5 | 4 | 6.4 |
| 11 | 0 | 100 | 25.5 | 25.5 | 0.0 | 40.8 | 20.4 | 71% | 0% | 10% | 1.97 | 6 | 6 | 15.8 |
| 12 | 0 | 100 | 25.5 | 25.5 | 17.7 | 0.0 | 20.4 | 80% | 9% | 11% | 1.65 | 6 | 6 | 21.3 |
| 13 | 100 | 0 | 77.7 | 0.0 | 0.0 | 0.0 | 3.3 | 98% | 0% | 2% | 1.23 | 2 | 5 | 4.9 |
| 14 | 100 | 0 | 77.7 | 0.0 | 17.7 | 0.0 | 0.0 | 91% | 9% | 0% | 1.51 | | 4 | 4.6 |
| 15 | 100 | 0 | 77.7 | 0.0 | 17.7 | 0.0 | 6.7 | 88% | 9% | 3% | 1.40 | 3 | 5 | 3.7 |
| 16 | 100 | 0 | 77.7 | 0.0 | 17.7 | 0.0 | 20.5 | 82% | 8% | 9% | 1.20 | | 4 | 4.0 |
| 17 | 100 | 0 | 38.8 | 38.8 | 0.0 | 26.7 | 20.5 | 79% | 0% | 9% | 1.29 | 3-4 | 6 | 3.9 |
| 18 | 100 | 0 | 38.8 | 38.8 | 0.0 | 83.0 | 20.5 | 63% | 0% | 7% | 1.86 | 3 | 4 | 4.9 |
| 19 | 100 | 0 | 38.8 | 38.8 | 0.0 | 33.3 | 20.5 | 77% | 0% | 9% | 1.36 | 3 | 6 | 5.0 |
| 20 | 100 | 0 | 38.8 | 38.8 | 17.7 | 0.0 | 20.5 | 82% | 8% | 9% | 1.20 | 3 | 5 | 3.4 |

Other tests showed that the effectiveness of some of these coatings in combatting oxidation was very good starting at a thickness of 60 mg/cm$^2$.

Finally, different results were obtained at higher temperatures: oxidation of approximately 18 mg/h/cm$^2$ was found at 750° C., namely one-tenth that of the uncoated surface, and oxidation of approximately 48 mg/h/cm$^2$ was found at 950° C., namely one-quarter the loss experienced by the uncoated surface at this temperature. In all cases, the coating offered effective oxidation protection.

EXAMPLE 2

Thirty-six coated anodes were followed through a complete change cycle of all the anodes in an electrolysis cell.

The mixture chosen for the coating was the following:

| | |
|---|---|
| Water | 400 g |
| GEOPOLYMITE ® GP 140/A | 1024 g, belonging to the poly(sialate-disiloxo) family |
| GEOPOLYMITE ® GP 20/AN | 1024 g, hardener containing K$^+$ ions |
| GEOPOLYMITE ® HT 600 | 2636 g, belonging to the fluoropoly (sialate-disiloxoy) family |
| Altech ® alumina AC34B6 | 466 g |

The slip obtained after mixing at room temperature is sprayed with an "Airless" gun that uses hydraulic pressure and allows anodes to be rapidly and correctly coated at the rate of 8 per half-day.

The test itself consists primarily of weighing the anodes before and after use. Statistical analysis of carbon consumption shows that, for the most exposed anodes, the coating produces a saving of about ten kg of carbon per ton of aluminum produced.

Dimensional inspections at the upper parts of the anodes showed an approximately 30% decrease in anode wear.

Also, a test of the Si, K, and Na levels was made in the salt bath and in the metal: no pollution by the coating was found.

We claim:

1. A process for depositing a coating protecting the surfaces of carbon-containing products exposed to a hot oxidizing environment, comprising the following steps:
   a) preparing the surface to be protected by brushing off any dust;
   b) cold-mixing the components of a slip, said slip comprising a geopolymer wherein said geopolymer is present in an amount greater than 60 wt % based on total slip weight, and wherein the sum of the weight concentrations of solid components in said slip is greater than 1.2 times and less than twice the sum of the weight concentrations of liquid components in said slip;
   c) depositing the slip on the surface to be protected to a thickness of 40 to 100 mg/cm$^2$;
   d) drying the slip for about thirty hours.

2. The process as claimed in claim 1, wherein said slip further comprises up to 15 wt % alumina.

3. The process as claimed in claim 2, wherein said slip further comprises, in powder form, a refractory other than alumina.

4. The process as claimed in claim 3, wherein said refractory is selected from the group consisting of carbides, borides, nitrides, silicides, oxides and mixtures thereof.

5. The process as claimed in claim 1, wherein said slip further comprises up to 25 wt % water.

6. Aluminum electrolysis cell anode coated, at least on its part exposed to the oxidizing action of the atmosphere prevailing above an electrolysis bath when in use, with a coating comprising polysilicates and at least one alkaline inorganic polymer comprising sialate groups.

7. The cell anode according to claim 6, wherein said coating comprises at least one alkaline inorganic polymer containing poly(sialate-disiloxo) groups.

8. The cell anode of claim 6, wherein said coating comprises at least one alkaline inorganic polymer containing fluoropoly(sialate-disiloxo) groups.

9. The cell anode of claim 6, wherein said coating further comprises alumina.

10. The cell anode of claim 9, wherein said coating further comprises a refractory component other than alumina.

11. The cell anode according to claim 10, wherein said refractory component other than alumina is selected from the group consisting of carbides, borides, nitrides, silicides, oxides and mixtures thereof.

12. The cell anode of claim 6, wherein said coating is present in a thickness of between 40 and 100 mg/cm$^2$.

13. A coated liner for an aluminum electrolysis cell for use in a hot, oxidizing environment, said liner being coated at least on a part exposed to said hot, oxidizing environment when in use, said coating comprising the reaction product of a polysilicate and at least one alkaline inorganic polymer comprising sialate groups, wherein said coating has a thickness of from 40–100 mg/cm$^2$.

14. The liner according to claim 13, wherein said coating comprises the reaction product of at least one alkaline inorganic polymer containing poly(sialate-disiloxo) groups.

15. The liner of claim 13, wherein said coating comprises the reaction product of at least one alkaline inorganic polymer containing fluoropoly(sialate-disiloxo) groups.

16. The liner of claim 13, wherein said coating further comprises alumina.

17. The liner of claim 16, wherein said coating further comprises a refractory component other than alumina.

18. The liner according to claim 17, wherein said refractory other than alumina is selected from the group consisting of carbides, borides, nitrides, suicides, oxides and mixtures thereof.

* * * * *

UNITED STATES PATENT AND TRADEMARK OFFICE
CERTIFICATE OF CORRECTION

PATENT NO. : 5,851,677

DATED : December 22, 1998

INVENTOR(S): Veronique Laurent, et al.

It is certified that an error appears in the above-identified patent and that said Letters Patent is hereby corrected as shown below:

Column 8, Line 45, "suicides" should read --silicides--.

Signed and Sealed this

Thirty-first Day of August, 1999

Attest:

Q. TODD DICKINSON

Attesting Officer     Acting Commissioner of Patents and Trademarks